(12) United States Patent
Ma et al.

(10) Patent No.: US 6,332,933 B1
(45) Date of Patent: *Dec. 25, 2001

(54) IRON-RARE EARTH-BORON-REFRACTORY METAL MAGNETIC NANOCOMPOSITES

(75) Inventors: Bao-Min Ma, Robbinsville, NJ (US); Charles O. Bounds, Yardley, PA (US); Wen Cheng Chang, Chia-Yi (TW); Qun Chen, Princeton, NJ (US)

(73) Assignee: Santoku Corporation, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/001,727

(22) Filed: Dec. 31, 1997

Related U.S. Application Data

(60) Provisional application No. 60/062,830, filed on Oct. 22, 1997, provisional application No. 60/062,832, filed on Oct. 22, 1997, provisional application No. 60/062,940, filed on Oct. 22, 1997, and provisional application No. 60/062,939, filed on Oct. 22, 1997.

(51) Int. Cl.$^7$ ..................................... H01F 1/057
(52) U.S. Cl. ..................... 148/302; 148/101; 148/121; 252/62.54
(58) Field of Search ................... 148/302, 101, 148/121, 104; 420/83, 121; 252/62.54

(56) References Cited

U.S. PATENT DOCUMENTS

| | | |
|---|---|---|
| Re. 34,322 | 7/1993 | Koon . |
| Re. 34,838 * | 1/1995 | Mohri et al. ............... 148/302 |
| 4,402,770 | 9/1983 | Koon . |
| 4,409,043 | 10/1983 | Koon . |
| 4,533,408 | 8/1985 | Koon . |
| 4,663,066 | 5/1987 | Fruchart et al. . |
| 4,664,724 | 5/1987 | Mizoguchi et al. . |
| 4,734,131 | 3/1988 | Arai et al. . |
| 4,747,874 | 5/1988 | Ghandehari . |
| 4,765,848 * | 8/1988 | Mohri et al. ............... 148/302 |

(List continued on next page.)

FOREIGN PATENT DOCUMENTS

| | | |
|---|---|---|
| 0 242 187 * | 10/1987 | (EP) . |
| 0 657 899 A1 | 6/1995 | (EP) . |
| 6124825 | 5/1994 | (JP) . |
| WO 92/15995 | 9/1992 | (WO) . |

OTHER PUBLICATIONS

Mishra, "Microstructure–Property Relationships in Magnequench Magnets", *Mat. Res. Soc. Symp. Proc.*, 1987, pp. 83–92, vol. 96.

Animesh et al., "Kinetics of Crystallization of Rapidly Quenched FENdB Alloy and its Application in the Processing of Permanent Magnets", *Journal of Non–Crystalline Solids*, 1989, pp. 185–194, vol. 113, Elsevier Science Publishers B.V., North–Holland.

(List continued on next page.)

*Primary Examiner*—John Sheehan
(74) *Attorney, Agent, or Firm*—Stevens, Davis, Miller & Mosher, LLP

(57) ABSTRACT

Magnetic nanocomposite materials including iron, rare earth elements, boron, refractory metal and, optionally, cobalt are disclosed. Neodymium and lanthanum are preferred rare earth elements. The amounts of Nd, La, B and refractory metal are controlled in order to produce both hard and soft magnetic phases, as well as a refractory metal boride precipitated phase. The refractory metal boride precipitates serve as grain refiners and substantially improve the magnetic properties of the nanocomposite materials. The materials are particularly suitable for making bonded magnets.

50 Claims, 2 Drawing Sheets

U.S. PATENT DOCUMENTS

| | | |
|---|---|---|
| 4,770,702 | 9/1988 | Ishigaki et al. . |
| 4,770,723 | 9/1988 | Sagawa et al. . |
| 4,792,368 | 12/1988 | Sagawa et al. . |
| 4,802,931 | 2/1989 | Croat . |
| 4,836,868 * | 6/1989 | Yajima et al. ...................... 148/302 |
| 4,851,058 | 7/1989 | Croat . |
| 4,867,785 | 9/1989 | Keem et al. . |
| 4,902,360 | 2/1990 | Ma et al. . |
| 4,935,074 | 6/1990 | De Mooij et al. . |
| 4,952,239 | 8/1990 | Tokunaga et al. . |
| 4,975,129 | 12/1990 | Fujimura et al. . |
| 4,975,130 | 12/1990 | Matsuura et al. . |
| 4,981,532 | 1/1991 | Takeshita et al. . |
| 4,983,232 | 1/1991 | Endoh et al. . |
| 5,037,492 | 8/1991 | Brewer et al. . |
| 5,041,171 | 8/1991 | Buschow et al. . |
| 5,049,208 | 9/1991 | Yajima et al. . |
| 5,071,493 | 12/1991 | Mizoguchi et al. . |
| 5,096,512 | 3/1992 | Sagawa et al. . |
| 5,114,502 | 5/1992 | Bogatin . |
| 5,135,584 | 8/1992 | Fujiwara . |
| 5,162,064 | 11/1992 | Kim et al. . |
| 5,172,751 | 12/1992 | Croat . |
| 5,174,362 | 12/1992 | Croat . |
| 5,186,761 | 2/1993 | Kobayashi et al. . |
| 5,194,098 | 3/1993 | Sagawa et al. . |
| 5,213,631 | 5/1993 | Akioka et al. . |
| 5,228,930 | 7/1993 | Nakayama et al. . |
| 5,250,206 | 10/1993 | Nakayama et al. . |
| 5,281,250 | 1/1994 | Hamamura et al. . |
| 5,403,408 | 4/1995 | Krause et al. . |
| 5,411,608 | 5/1995 | Hazelton et al. . |
| 5,449,417 | 9/1995 | Shimizu et al. . |
| 5,460,662 | 10/1995 | Kobayashi et al. . |
| 5,545,266 | 8/1996 | Hirosawa et al. . |
| 5,549,766 | 8/1996 | Tsutai et al. . |
| 5,567,891 | 10/1996 | Bogatin et al. . |
| 5,591,276 | 1/1997 | Yoshizawa et al. . |
| 5,591,535 | 1/1997 | Hisano et al. . |
| 5,597,425 | 1/1997 | Akioka et al. . |
| 5,626,690 | 5/1997 | Matsuki et al. . |
| 5,634,987 | 6/1997 | Zhang et al. . |
| 5,643,491 | 7/1997 | Honkura et al. . |
| 5,645,651 | 7/1997 | Fujimura et al. . |
| 5,647,886 | 7/1997 | Kitazawa et al. . |
| 5,656,100 | 8/1997 | Yamamoto et al. . |
| 5,674,327 | 10/1997 | Yamamoto et al. . |
| 5,690,752 | 11/1997 | Yamamoto et al. . |

OTHER PUBLICATIONS

Fuerst et al., "Melt–Spun $Nd_2(Co_xFe_{1-x})_{14}B$ Systems: Optimization of the Hard Magnetic Properties", *J. Appl. Phys.*, Aug. 15, 1989, pp. 1782–1788, vol. 66, No. 4.

Coehoorn et al., "Preparation and Magnetic Properties of R–Fe–B Permanent Magnet Materials Containing $Fe_3B$ as the Main Phase", *Journal of Magnetism and Magnetic Materials*, 1990, pp. 228–230, vol. 83, North–Holland.

Manaf et al., "Enhanced Magnetic Properties in Rapidly Solidified Nd–Fe–B Based Alloys", *Journal of Magnetism and Magnetic Materials*, 1991, pp. 360–362, vol. 101, North–Holland.

Manaf et al., "Effect of Grain Size and Microstructure on Magnetic Properties of Rapidly Solidified $Fe_{82.4}Nd_{13.1}B_{4.5}$ Alloy", *J. Appl. Phys.*, Nov. 15, 1991, pp. 6366–6368, vol. 70, No. 10.

Manaf et al., "New Nanocrystalline High–Remanance Nd–Fe–B Alloys By Rapid Solidification", *Journal of Magnetism and Magnetic Materials*, 1993, pp. 302–306, vol. 128, Elsevier Science Publishers B. V., North–Holland.

Manaf et al., "Microstructure Analysis of Nanocrystalline Fe–Nd–B Ribbons With Enhanced Hard Magentic Properties", *Journal of Magnetism and Magnetic Materials*, 1993, pp. 307–312, vol. 128, Elsevier Science Publishers B. V., North–Holland.

Manaf et al., High–Energy–Product Rapdily Solidified Fe–Nd–B Alloys With Additions of Nb and Si, *J. Appl. Phys.*, May 15, 1993, pp. 6473–6475, vol. 73, No. 10.

Kanekiyo et al., "Microstructure and Magnetic Properties of High–Remanence $Nd_5Fe_{71.5}Co_5B_{18.5}M$ (M=Al, Si, Ga, Ag, Au) Rapidly Solidified and Crystallized Alloys for Resin–Bonded Magnets", *IEEE Transactions on Magnetics*, Nov. 1993, pp. 2863–2865, vol. 29, No. 6.

Manaf et al., "Magnetic Properties and Microstructural Characterisation of Isotropic Nanocrystalline Fe–Nd–B Based Alloys", *IEEE Transactions on Magnetics*, Nov. 1993, pp. 2866–2868, vol. 29, No. 6.

Bauer et al., "Magnetic Properties and Microstructural Analysis of Rapidly Quenched FeNdBGaNb Permanent Magnets", *Journal of Magnetism and Magnetic Materials*, 1995, pp. 323–334, Vo. 139, Elsevier Science B.V.

Rieger et al., "Micromagnetic Analysis Applied to Melt–Spun NdFeB Magnets with Small Additions of Ga and Mo", *Journal of Magnetism and Magnetic Materials*, 1995, pp. 193–201, vol. 151, Elsevier Science B.V.

Bauer et al., "Nanocrystalline FeNdB Permanent Magnets With Enhanced Remanence", *J. Appl. Phys.*, Aug. 1, 1996, pp. 1667–1673, vol. 80, No. 3.

Chang et al., "The Effects of La–Substitution on the Microstructure and Magnetic Properties of Nanocomposite NdFeB Melt Spun Ribbons", *Journal of Magnetism and Magnetic Materials*, 1997, pp. 65–70, vol. 167, Elsevier Science B.V.

Translation of foreign Office Action issued Jan. 10, 2001 citing reference.

* cited by examiner

IRON-RARE EARTH-BORON-REFRACTORY METAL MAGNETIC NANOCOMPOSITES

CROSS-REFERENCE TO RELATED APPLICATIONS

This application claims the benefit of U.S. Provisional Application Ser. Nos. 60/062,830, 60/062,832, 60/062,939 and 60/062,940, filed Oct. 22, 1997, each of which is incorporated herein by reference.

FIELD OF THE INVENTION

The present invention relates to magnetic materials, and more particularly relates to magnetic nanocomposite materials including iron, rare earth elements, boron and refractory metals which have favorable magnetic properties and are suitable for making bonded magnets.

BACKGROUND INFORMATION

Magnetic alloys containing neodymium, iron and boron have been widely studied for use in sintered and bonded magnets due to their favorable magnetic properties. The $Nd_2Fe_{14}B$ phase has been identified as a hard magnetic phase exhibiting particularly good magnetic properties.

U.S. Pat. Nos. 4,402,770, 4,409,043 and Re. 34,322 to Koon, which are incorporated herein by reference, disclose magnetic alloys comprising lanthanum and other rare earth elements, transition metals such as iron and cobalt, and boron within specified ranges. Although the disclosed alloys have been found to possess good magnetic properties, such alloys do not have optimal properties, and have not become commercially viable.

The present invention has been developed in view of the foregoing and to address other deficiencies of the prior art.

SUMMARY OF THE INVENTION

The present invention provides a nanocomposite magnetic material of controlled composition which exhibits improved magnetic properties and can be easily processed.

An object of the present invention is to provide a nanocomposite magnetic material comprising Fe, rare earth elements, B, refractory metals and, optionally, Co within specified ranges.

Another object of the present invention is to provide a nanocomposite magnetic material of the formula: $(Nd_{1-y}La_y)_v Fe_{100-v-w-x-z}Co_wM_zB_x$, where M is least one refractory metal selected from Ti, Zr, Hf, V, Nb, Ta, Cr, Mo and W; v is from about 5 to about 15; w is from 0 to about 40; x is from about 9 to about 30; y is from about 0.05 to about 0.5; and z is from about 0.1 to about 5.

A further object of the present invention is to provide a nanocomposite magnetic material including a hard magnetic phase, a soft magnetic phase, and a refractory metal boride precipitated phase. The hard magnetic phase is preferably $Nd_2Fe_{14}B$, while the soft magnetic phase preferably comprises $\alpha$-Fe, $Fe_3B$ or a combination thereof.

Another object of the present invention is to provide a method of making a nanocomposite magnetic material. The method includes the steps of providing a molten composition comprising Fe, rare earth elements, B, at least one refractory metal and, optionally, Co, rapidly solidifying the composition to form a substantially amorphous material, and thermally treating the material to form crystalline magnetic phases of desired composition and size.

These and other objects of the present invention will become more apparent from the following description.

DETAILED DESCRIPTION OF THE PREFERRED EMBODIMENTS

Figure 1:
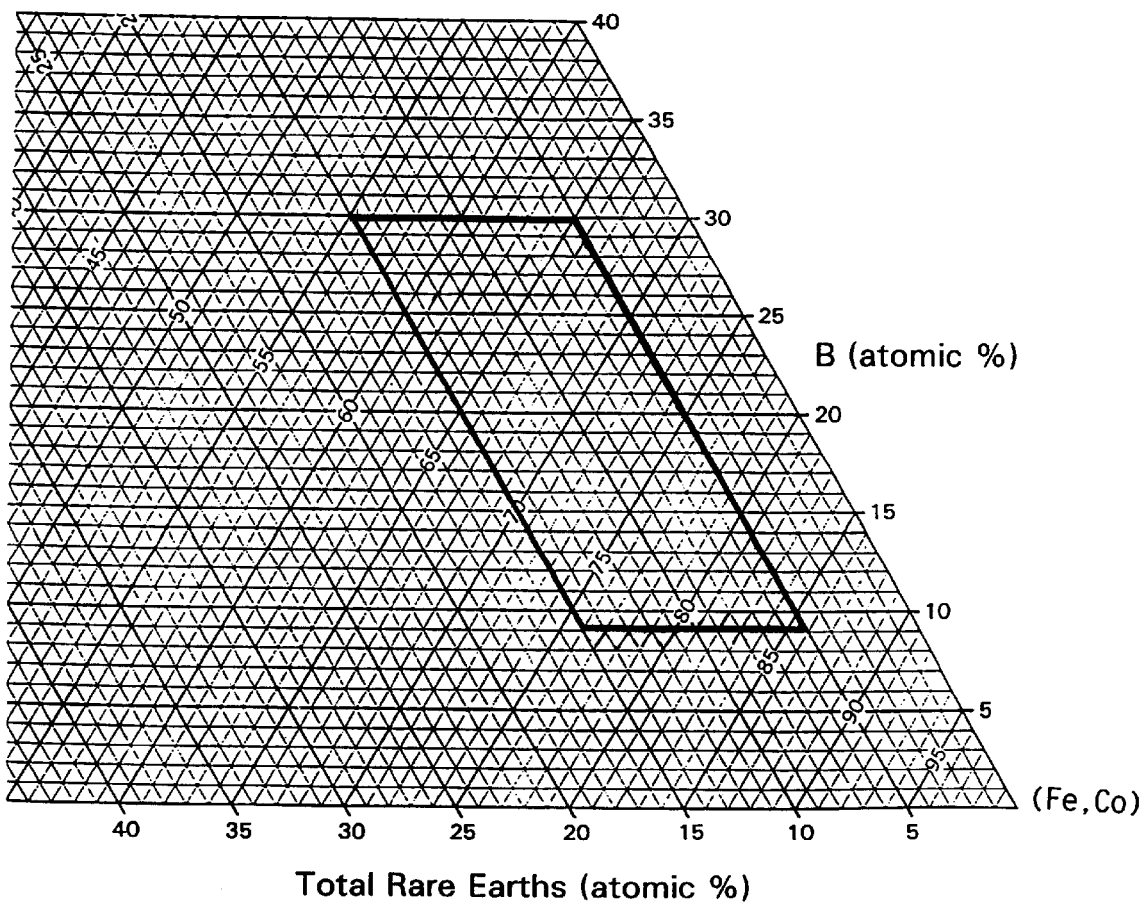
FIG. 1 is a ternary phase diagram showing the total rare earth (TRE), iron/cobalt (Fe, Co), and boron (B) content of nanocomposite magnetic materials in accordance with an embodiment of the present invention.

The magnetic nanocomposite compositions of the present invention include rare earth elements, iron, boron, refractory metals and, optionally, cobalt. Suitable rare earth elements include La, Ce, Pr, Nd, Pm, Sm, Eu, Gd, Tb, Dy, Ho, Er, Tm, Yb and Lu. The total rare earth content of the present compositions is referred to herein as "TRE". The term "RE" as used herein means all of the suitable rare earth elements except La. Preferred RE elements are Nd, Pr, Dy, Tb and mixtures thereof, with Nd, Pr and mixtures thereof being most preferred. Suitable refractory metals include elements of Groups IVb, Vb and VIb of the Periodic Table, e.g., Ti, Zr, Hf, V, Nb, Ta, Cr, Mo and W. The refractory metal content of the present compositions is referred to herein as "M". Typical, preferred and more preferred ranges of TRE, B, M and Co are set forth in Table 1.

TABLE 1

| | Compositions (atomic percent) | | | | |
|---|---|---|---|---|---|
| | TRE | B | M | Co | Fe |
| typical | 5–15 | 9–30 | 0.1–5 | 0–40 | balance |
| preferred | 9–12 | 9–12 | 0.5–3 | 1–20 | balance |
| more preferred | 9.5–11.5 | 9.5–11 | 1–2.5 | 5–15 | balance |

In accordance with the present invention, the compositions of the present invention may correspond to the formula: $(RE_{1-y}La_y)_v Fe_{100-v-w-x-z}Co_wM_zB_x$, where RE is at least one rare earth element excluding La; M is at least one refractory metal selected from Ti, Zr, Hf, V, Nb, Ta, Cr, Mo and W; v is from about 5 to about 15; w is from 0 to about 40; x is from about 9 to about 30; y is from about 0.05 to about 0.5; and z is from about 0.1 to about 5. Preferably, RE is at least one element selected from Nd, Pr, Dy and Tb; M is at least one refractory metal selected from Ti, V, Nb, Cr and Mo; v is from about 9 to about 12; w is from about 1 to about 20; x is from about 9 to about 12; y is from about 0.05 to about 0.1; and z is from about 0.5 to about 3. More preferably, RE is Nd, Pr or a mixture thereof; M is Ti, Nb or Cr; v is from about 9.5 to about 11.5; w is from about 5 to about 15; x is from about 9.5 to about 11; y is from about 0.05 to about 0.1; and z is from about 1 to about 2.5. In particularly preferred compositions, v is about 11.0, w is about 10, x is about 10.5, y is about 0.05 or 0.075, and z is about 2.

Alternatively, the compositions of the present invention may be expressed by the formula: $(Fe_wM_xB_{1-w-x})_{1-y}(R_2La_{1-z})_y$, where M is at least one refractory metal selected from Ti, Zr, Hf, V, Nb, Ta, Cr, Mo and W; R is at least one rare earth element selected from Ce, Pr, Nd, Pm, Sm, Eu, Gd, Tb, Dy, Ho, Er, Tm, By and Lu; w is from about 0.7 to about 0.9; x is from about 0.001 to about 0.06; y is from about 0.05 to about 0.15; z is from about 0.5 to about 0.95; and up to about 40 atomic percent of the Fe may optionally be replaced by Co. This alternative nomenclature is similar to the nomenclature used in U.S. Pat. No. 4,402,770 to Koon. In accordance with the present invention refractory metal within controlled amounts to compositions similar to those disclosed in U.S. Pat. No. 4,402,770 to Koon has been found to substantially improve the properties of the compositions, resulting in a commercially viable magnetic nanocomposite material.

The TRE content of the present compositions is controlled in order to provide desirable properties. Neodymium is a preferred rare earth element, which is provided in sufficient amounts to form the desired molar fraction of the $Nd_2Fe_{14}B$ hard magnetic phase. Some or all of the Nd may be substituted by Pr. The TRE constituent preferably includes a minor amount of La which provides several benefits. For example, La is a glass former which facilitates the formation of an amorphous precursor alloy by rapid solidification. Furthermore, La has been found to suppress grain growth during subsequent thermal treatment of the rapidly solidified amorphous alloy. Lanthanum preferably comprises from about 5 to about 50 atomic percent of the total rare earth content of the compositions.

The B content of the present compositions is controlled in order to form the desired amount of the hard magnetic phase (e.g., $Nd_2Fe_{14}B$), and to form borides of the refractory metal constituent of the compositions. As described more fully below, such borides act as a precipitation hardening or grain refining phase which improves the properties of the compositions substantially. Furthermore, B is a glass former which facilitates formation of an amorphous product during rapid solidification of the compositions. A sufficient amount of B should be used in order to improve the properties of the nanocomposite material. Boron levels of greater than or equal to about 9 or 9.5 atomic percent are preferred, with levels of greater than or equal to about 10 or 10.5 atomic percent being particularly preferred.

The refractory metal M content of the present compositions is controlled in order to provide grain refinement of the compositions, while avoiding substantial degradation of magnetic properties. At least a portion of the refractory metal reacts with boron to form borides, which promote homogenous nucleation of magnetic phase grains. The refractory borides are located, at least in part, at the grain boundaries of the magnetic phases, and produce grain refinement thereof. In addition, the refractory metal borides suppress formation of the undesirable $Nd_2Fe_{23}B_3$ metastable phase, and promote the formation of the $Nd_2Fe_{14}B$ and α-Fe magnetic phases. However, at too high a concentration, the refractory metal may react to an undesirable extent with boron to form large particles which are located at the triple junctions between grains of the magnetic phases. Furthermore, if too much of the refractory metal is present it will preferentially react with boron, thereby suppressing the formation of the desirable $Nd_2Fe_{14}B$ hard magnetic phase.

Cobalt may be added to the present compositions in order to increase remanence and maximum energy product magnetic properties. Cobalt additions may also increase the Curie temperature ($T_c$) of the hard magnetic phase and increase the fluidity of the molten alloy.

The nanocomposite materials of the present invention preferably comprise a hard magnetic phase, a soft magnetic phase, and a refractory metal boride precipitated phase. The hard magnetic phase comprises $RE_2Fe_{14}B$, while the soft magnetic phase may include α-Fe, α-(Fe,Co), $Fe_3B$, (Fe, Co)$_3$B, $Fe_2B$ and (Fe,Co)$_2$B. Typically, the hard magnetic phase comprises $Nd_2Fe_{14}B$ and the soft magnetic phase comprises α-Fe, $Fe_3B$ or a combination thereof. The refractory metal boride precipitated phase may comprise borides such as TiB, $Ti_3B_4$, $TiB_2$, $NbB_2$, NbB, $Nb_3B_2$, CrB, $CrB_2$, $Cr_3B_4$, $Mo_2B$, MoB, $Mo_2B_5$, $MoB_4$, $ZrB_2$, $W_2B$, WB, $W_2B_5$, $WB_5$, VB, $V_3B_4$, $VB_2$ and combinations thereof. The average size of the refractory metal precipitates is typically from about 1 to about 30 nanometers. The refractory metal boride precipitate provides nucleation sites and acts as a grain refiner which improves the magnetic properties of the compositions substantially.

Phases which degrade magnetic properties to an undesirable extent are preferably minimized or eliminated from the compositions. For example, the $RE_2Fe_{23}B_3$ (e.g., $Nd_2Fe_{23}B_3$) metastable phase is preferably reduced or eliminated. Other phases such as Nd-Fe eutectic, $Nd_2Fe_{17}$, $Nd_2Co_{17}$ and $NdFe_4B_4$ may also be reduced or eliminated from the compositions. In accordance with the present invention, the incorporation of refractory metal and the resultant formation of the refractory metal boride precipitated phase has been found to suppress the formation of the $Nd_2Fe_{23}B_3$ metastable phase. Prior to the present invention, alloy compositions with amounts of boron above about 9 or 10 atomic percent and rare earth amounts of about 7 to about 11.7 atomic percent have not been studied in depth and reported in the open literature because of the formation of undesirable phases, such as $Nd_2Fe_{23}B_3$, and the difficulty of obtaining materials with sufficiently high intrinsic coercivity ($H_{ci}$) when soft magnetic materials are present.

The nanocomposite materials of the present invention are preferably in powder form, having preferred average particle sizes of from about 10 to about 200 microns. The powders are preferably magnetically isotropic, and possess favorable magnetic properties such as remanence ($B_r$), intrinsic coercivity ($H_{ci}$) and/or maximum energy product ($BH_{max}$) The materials preferably have a $B_r$ of greater than about 7.2 kG, $H_{ci}$ of greater than about 6.0 kOe, and $BH_{max}$ of greater than about 8.0 MGOe.

While not intending to be bound by any particular theory, the nanocomposite materials of the present invention are believed to exhibit exchange coupling which results from the combination of hard and soft magnetic phases having controlled sizes and desired distribution. As used herein, the term "exchange coupling" means the electron exchange interaction coupled between the hard and soft magnetic phases. The average grain size of the soft magnetic phase is preferably less than the domain wall width of the hard magnetic phase (e.g., $Nd_2Fe_{14}B$). The average grain size of the soft magnetic phase is preferably from about 2 to about 60 nanometers, while the average grain size of the hard magnetic phase is from about 10 to about 100 nanometers. More preferably, the soft magnetic phase has an average grain size of from about 2 to about 30 nanometers, while the hard magnetic phase has an average grain size of from about 10 to about 50 nanometers. For effective exchange coupling to occur the average grain size of the soft magnetic phase should preferably be no larger than the domain wall width of the hard magnetic phase, which has been estimated to be from about 10 to about 30 nanometers for the hard magnetic phase $Nd_2Fel_4B$.

In accordance with the present invention, the grain sizes of the soft and hard magnetic phases are controlled by the refractory metal boride precipitated phase, as well as the thermal processing conditions. The grain refining effect of the refractory metal boride precipitate phase promotes exchange coupling, and substantially improves the magnetic properties and processibility of the nanocomposite materials.

The magnetic materials of the present invention are preferably produced by a rapid solidification and thermal treatment process. Rapid solidification is achieved by quickly cooling the composition from the molten state by techniques such as melt spinning, jet casting, melt extraction, atomization and splat cooling. Cooling rates of from about $10^4$ to about $10^{7°}$ C. per second are typically employed, preferably from about $10^5$ to about $10^{6°}$ C. per second. The rapidly solidified material is preferably substantially amorphous. After rapid solidification the material may be ground, may be ground and heat treated, or may be directly heat treated.

The compositions of the present invention have been found to possess improved processibility, allowing slower rapid solidification rates to be used. For example, during the melt spinning process, slower rotational wheel speeds may be used and/or larger volumes of material may be processed. The ability to use slower melt spinning wheel speeds is important because the molten alloy puddle that is in contact with the spinning wheel is substantially more stable when the wheel speed is reduced. Furthermore, the ability to process larger volumes of material allows for reductions in production costs.

After the composition has been rapidly solidified to the substantially amorphous state, it is preferably thermally treated to induce spontaneous crystallization. As used herein, the term "spontaneous crystallization" means the rapid and substantially homogeneous formation of fine crystal grains. In accordance with the present invention, the refractory metal boride phase acts as a grain refiner.

The boride phase is also believed to provide nucleation sites for the soft and hard magnetic phases. These phases nucleate, but do not exhibit substantial grain growth after they nucleate.

Spontaneous crystallization is preferably achieved by heating the material to a specified temperature for a controlled period of time, which results in nucleation of crystal grains without substantial subsequent grain growth. Temperatures of from about 400 to about 800° C. are suitable, preferably from about 650 to about 750° C. Heating times of from about 0.001 second to about 2 hours are preferred, more preferably from about 0.01 second to about 10 minutes. The material may be heated in any suitable apparatus such as a furnace. Continuous and/or batch heating methods may be employed. Preferably, the material is heated to its crystallization temperature and the heat source is removed before substantial grain growth occurs.

The following examples illustrate various aspects of the present invention and are not intended to limit the scope thereof.

EXAMPLE 1

Figure 2:
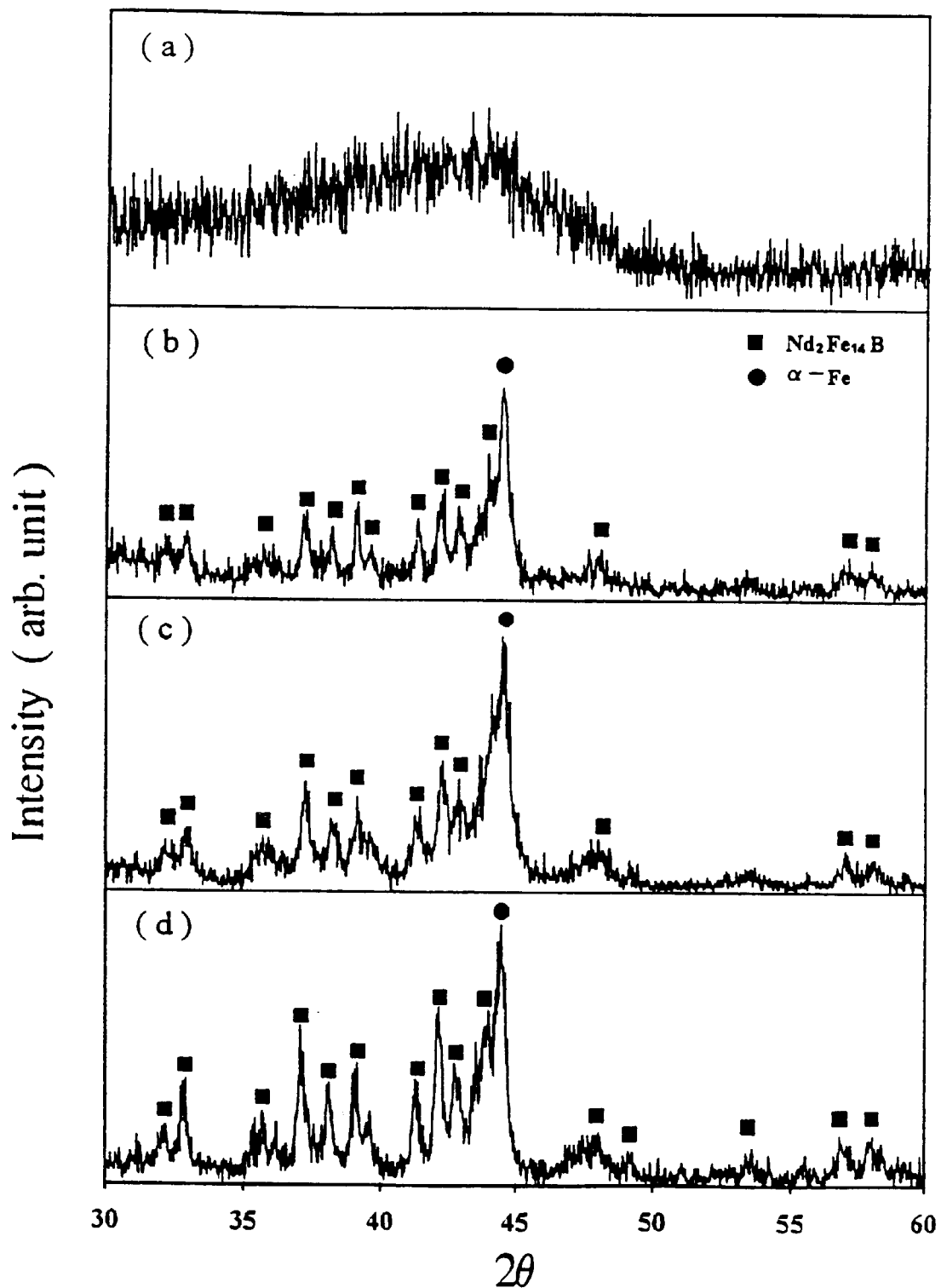
FIG. 2 is a series of X-ray diffraction patterns for rapidly solidified compositions comprising Nd, Fe and varying amounts of B, showing a change from crystalline to amorphous microstructure when the amount of B is increased.

Alloy ingots of $Nd_{9.5}Fe_{85.5-x}B_x$, where x=5, 6, 7, 8, 9, 10 and 10.5, are prepared by vacuum induction melting. A laboratory jet caster with a Cu-wheel is used for melt spinning. A wheel speed of 15–30 m/sec is used for preparing samples. The crystallization temperatures are determined by a Perken-Elmer Differential Thermal Analyzer (DTA-7). A Siemens x-ray diffractometer is used to determine the degree of amorphousness of the as-spun materials. FIG. 2 shows the x-ray diffraction patterns of $Nd_{9.5}Fe_{85.5-x}B_x$ melt spun at a wheel speed of 18 m/sec., where x=10.5 (pattern a), x=9 (pattern b), x=7 (pattern c), and x=5 (pattern d). As can be seen, at x<9, materials obtained are partially crystallized in the as-melt spun state. Both α-Fe and $Nd_2Fe_{14}B$ are present. The amount of α-Fe decreases with the increasing B-content. At x>9.5, these materials are nearly amorphous and α-Fe is diminished. Table 2 lists the optimum magnetic properties after thermal treatment. In general, $H_{ci}$ decreases with increasing boron content up to about 9 atomic percent, and then increases with boron levels above about 9 atomic percent. A similar trend can also be observed for $B_r$ and $BH_{max}$. This indicates that there is a change in either the phase formation/distribution or the magnetization mechanism when the boron content is increased above about 9 atomic percent. These data show that in Nd—Fe—B alloys incremental increases in the boron content above approximately 6 atomic percent lead to a steady decrease in the magnetic properties (e.g., $B_r$ and $H_{ci}$) of the coercive powder and provides a possible explanation why such alloys have not been utilized commercially.

TABLE 2

| B Content (x) | $T_g$ (° C.) | $B_r$ (kG) | $H_{ci}$ (kOe) | $BH_{max}$ (kOe) |
|---|---|---|---|---|
| 5 | crystallized | 11.7 | 6.6 | 18.7 |
| 6 | 650 | 11.9 | 6.3 | 19.0 |
| 8 | 710 | 9.5 | 5.2 | 13.5 |
| 9 |  | 8.0 | 4.5 | 9.4 |
| 10 |  | 8.0 | 4.9 | 9.8 |
| 10.5 |  | 8.4 | 5.1 | 11.0 |

EXAMPLE 2

Alloy ingots of $(Nd_{1-y}La_y)_{9.5}Fe_{85.5}B_5$, where y=0, 0.05, 0.10 or 0.15 atomic percent, are prepared by vacuum induction melting. A laboratory jet caster with a Cu-wheel is used for melt spinning. A wheel speed of about 15–20 m/sec is used for preparing samples. The crystallization temperatures are determined by a Perken-Elmer Differential Thermal Analyzer (DTA-7). Melt spun ribbons are thermal treated in a temperature range of 650 to 670° C. for 10 minutes. The magnetic properties obtained after optimum thermal treatment are listed in Table 3. The crystallization temperature decreases from 569 to 562° C. when the La content increases from 0 to 0.15 atomic percent. Considerable increases in both $B_r$ and $BH_{max}$ are observed in materials with some La substitution for Nd. These data show that the substitution of La for Nd in certain alloy compositions shows some improvement, e.g., increases the $B_r$ with only minor reduction in $H_{ci}$.

TABLE 3

| La Content (y) | $T_g$ (° C.) | $B_r$ (kG) | $H_{ci}$ (kOe) | $BH_{max}$ (kOe) |
|---|---|---|---|---|
| 0 | 569 | 8.6 | 6.0 | 11.0 |
| 0.05 | 564 | 9.6 | 5.9 | 13.5 |
| 0.10 | 563 | 9.8 | 5.9 | 12.5 |
| 0.15 | 562 | 9.2 | 5.7 | 12.0 |

EXAMPLE 3

Alloy ingots of $(Nd_{0.95}La_{0.05})_{9.5}Fe_{81.5-z}Cr_zB_9$ are prepared by vacuum induction melting. A laboratory jet caster with a Cu-wheel is used for melt spinning. A wheel speed of 15–18 m/sec is used for preparing the $(Nd_{0.95}La_{0.05})_{9.5}Fe_{81.5-z}Cr_zB_9$ samples. The crystallization temperatures are determined by a Perken-Elmer Differential Thermal Analyzer (DTA-7). Melt spun ribbons are thermally processed in the temperature range of 650 to 670° C. for 10 minutes. The magnetic properties obtained after optimum thermal treatment are listed in Table 4. The Cr substitution increases the crystallization temperature from 608 to 635° C.

when the Cr content increases from 0 to 8.1 atomic percent. Because of the diluting effect, the $B_r$ decreases with increasing Cr content. A significant increase in $H_{ci}$ is observed when the Cr content is increased from 0 to 2.7 atomic percent. These data show that the $H_{ci}$ of the magnetic powder of certain compositions can be increased by the substitution of a Cr refractory metal for Fe, with only a minor decrease in the $B_r$.

TABLE 4

| Cr Content (z) | $T_g$ (° C.) | $B_r$ (kG) | $H_{ci}$ (kOe) | $BH_{max}$ (kOe) |
| --- | --- | --- | --- | --- |
| 0 | 608 | 9.8 | 6.1 | 11.5 |
| 2.7 | 610 | 8.3 | 9.0 | 12.3 |
| 5.4 | 626 | 8.0 | 9.2 | 11.8 |
| 8.1 | 635 | 6.7 | 9.8 | 7.7 |

EXAMPLE 4

Alloy ingots of $(Nd_{0.95}La_{0.05})_v Fe_{88-v} Cr_2 B_{10}$, where v=7.5 to 11.5, are prepared by vacuum induction melting. A laboratory jet caster with Cu-wheel is used for melt spinning. A wheel speed in the range of 15 to 25 m/sec is used for melt spinning. The melt spun ribbons obtained are thermally processed in the temperature range of 675 to 700° C. for 10 minutes. The optimum magnetic properties are listed in Table 5. These data illustrate the effect of varying amounts of TRE in alloys containing 10 atomic percent B. The preferred alloys are in the range of from about 9.5 to about 11.5 atomic percent TRE.

TABLE 5

| v | $B_r$ (kG) | $H_{ci}$ (kOe) | $BH_{max}$ (kOe) |
| --- | --- | --- | --- |
| 7.5 | 8.5 | 3.1 | 8.1 |
| 8.5 | 8.3 | 4.0 | 10.0 |
| 9.5 | 8.6 | 9.1 | 12.6 |
| 10.5 | 9.2 | 11.1 | 16.5 |
| 11.0 | 9.5 | 13.2 | 18.0 |
| 11.5 | 9.9 | 5.0 | 14.0 |

EXAMPLE 5

Alloy ingots of $(Nd_{0.95}La_{0.05})_{9.5} Fe_{88-w} Co_w Cr_2 B_{10.5}$, where w=0 to 10 atomic percent, are prepared by vacuum induction melting. A laboratory jet caster with Cu-wheel is used for melt spinning. A wheel speed in range of 15 to 25 m/sec is used for melt spinning. Melt spun ribbons obtained are thermally processed in the temperature range of 675 to 700° C. for 10 minutes. The optimum magnetic properties are listed in Table 6. The substitution of Co for Fe causes a dramatic increase in the $B_r$, with only a minor decrease in the $H_{ci}$ for alloy powders that contain La substituted for Nd and a refractory metal.

TABLE 6

| Co Content (w) | $B_r$ (kG) | $H_{ci}$ (kOe) | $BH_{max}$ (kOe) |
| --- | --- | --- | --- |
| 0 and without Cr | 7.8 | 6.2 | 9.5 |
| 0 | 8.4 | 10.3 | 14.0 |
| 2.5 | 8.4 | 10.2 | 14.1 |
| 5.0 | 8.5 | 10.2 | 14.1 |
| 7.5 | 9.1 | 10.3 | 15.8 |
| 10.0 | 10.0 | 9.5 | 19.8 |

EXAMPLE 6

Alloy ingots of $(Nd_{0.95}La_{0.05})_{9.5} Fe_{78} M_2 B_{10.5}$, where M=Cr, Ti, V, Mo or Nb, are prepared by vacuum induction melting. A comparative composition containing no refractory metal addition corresponding to a composition with the ranges disclosed in U.S. Pat. No. 4,402,770 to Koon is prepared in an identical manner. A laboratory jet caster with Cu-wheel is used for melt spinning. A wheel speed in range of 15 to 25 m/sec is used for melt spinning. Melt spun ribbons obtained are thermally processed in the temperature range of 650 to 700° C. for 10 minutes. The optimum magnetic properties obtained are listed in Table 7. These data establish that Cr, Ti, V, Mo and Nb refractory metal additions substantially improve magnetic properties in accordance with a preferred embodiment of the present invention.

TABLE 7

| M | $B_r$ (kG) | $H_{ci}$ (kOe) | $BH_{max}$ (kOe) |
| --- | --- | --- | --- |
| no addition | 7.8 | 6.2 | 9.5 |
| Cr | 8.3 | 14.1 | 13.9 |
| Ti | 8.8 | 11.9 | 15.0 |
| V | 8.7 | 9.6 | 15.0 |
| Mo | 8.3 | 10.5 | 14.0 |
| Nb | 8.0 | 4.1 | 13.0 |

EXAMPLE 7

Compositions of the formula $(Nd_{0.95}La_{0.05})_{10.5} Fe_{67} Co_{10} M_2 B_{10.5}$ are prepared as in the previous example, wherein M=Ti, Nb, Cr, Hf, W and Zr. A comparative composition containing no refractory metal addition corresponding to a composition with the ranges disclosed in U.S. Pat. No. 4,402,770 to Koon is prepared in an identical manner. The magnetic properties of the resultant compositions are listed in Table 8. Compositions in accordance with the present invention containing Co in combination with refractory metal additions exhibit substantially increased $H_{ci}$ and $BH_{max}$ properties.

TABLE 8

| M | $B_r$ (kG) | $H_{ci}$ (kOe) | $BH_{max}$ (kOe) |
| --- | --- | --- | --- |
| no addition | 7.8 | 6.3 | 9.8 |
| Ti | 9.5 | 15.4 | 18.2 |
| Nb | 8.8 | 19.4 | 16.2 |
| Cr | 9.8 | 12.6 | 18.8 |
| Hf | 9.7 | 10.4 | 19.8 |
| W | 9.6 | 15.2 | 18.6 |
| Zr | 9.5 | 14.0 | 17.5 |

Conventional magnetic alloy compositions are listed below in Table 9. The composition labelled "MQ" is commercially available from Magnequench International under the designation MQP-B, while the composition labelled "SSM" is commercially available from Sumitomo Special Metals Co. under the designation NEOMAX. These commercially available compositions have relatively high levels of rare earth elements and relatively low levels of B in comparison with the preferred compositions of the present invention.

TABLE 9

| Composition | TRE | TM atomic percent | B |
|---|---|---|---|
| $Nd_2Fe_{14}B$ | 11.7 | balance | 6.0 |
| MQ | 12.2–13.7 | balance | 5.7–5.8 |
| SSM | 14.0–15.0 | balance | 6.0–8.0 |

Table 10 lists the phases in molar fraction percent of conventional alloy compositions of the formula $Nd_{13.7}Fe_{80.7}B_{5.6}$ (MQP-A) and of the formula $Nd_{12.2}Fe_{77.0}Co_{5.0}B_{5.8}$ (MQP-B), in comparison with compositions of the present invention having compositions of the formula $(Nd_{0.95}La_{0.05})_{11.0}Fe_{73.3}Co_{5.2}B_{10.5}$ (Comp. No. 1) and of the formula $(Nd_{0.95}La_{0.05})_{9.5}Fe_{75}Co_5B_{10.5}$ (Comp. No. 2). The MQP-A and MQP-B compositions are commercially available from Magnequench International.

TABLE 10

| Phases | MQP-A | MQP-B | Comp. No. 1 | Comp. No. 2 |
|---|---|---|---|---|
| $Nd_2Fe_{14}B$ | 96 | 98 | 74 | 72 |
| α-Fe | 0 | 0 | 1 | 5–7 |
| $Fe_3B$ | — | — | 22–24.7 | 20 |
| $Nd_{1.1}Fe_4B_4$ | 0.01–0.1 | 0.08–0.2 | 0.3–3 | 1–3 |
| Nd-Fe eutectic | 4 | 1.8 | 0 | 0 |

In accordance with the present invention, bonded magnets with superior performance can be produced from the rapidly solidified and thermally processed coercive nanocomposite powders made from the compositions of the present invention. The bonded magnets may comprise, for example, from about 0.5 to about 4 weight percent of a binder of any suitable composition such as epoxy, nylon 6-6, polypropylene (PPE) or low melting point metals. The bonded magnets may be prepared by any suitable method. For example, the alloy may be ground to a powder having an average particle size of about 200 microns. The powder is combined and mixed with epoxy in a proporation of about 98 weight percent powder and about 2 weight percent epoxy. The materials are mixed by hand. The mixture is then placed into a die (about 10 mm) and pressed with a pressure of about 7.5 $MT/cm^2$ for approximately 30 seconds. The resulting pellet is released from the mold and cured at about 175° C. for approximately one hour. The pellet is then removed and allowed to cool to room temperature. The appropriate measurements of density and magnetic properties are then performed.

Whereas particular embodiments of this invention have been described above for purposes of illustration, it will be evident to those skilled in the art that numerous variations of the details of the present invention may be made without departing from the invention as defined in the appended claims.

What is claimed is:

1. A permanent magnet material characterized by magnetic properties of $BH_{max}>8$ MGOe, $B_r>7.2$ KG and $H_{ci}>6$ KOe and having the chemical formula: $((RE)_{1-y}(La)_y)_v Fe_{100-v-w-x-z} Co_w M_x B_z$, wherein RE is at least one element selected from the group consisting of Pr and Nd;
   M is at least one refractory metal selected from the group consisting of W, Ti, V, Nb, Hf; Cr, Zr and Mo;
   v=about 9.5 to about 11.5 atomic percent
   w=0 to about 15 atomic percent
   x=about 9.5 to about 11 atomic percent
   y=about 0.05 to about 0.15
   z=about 2 to about 3 atomic percent
   the material having been made by rapid cooling from melt as ribbons, filaments, particulates or powders at a cooling rate between $10^4$ to $10^6$ degrees C/second followed by annealing at temperatures between 650 to 750 degrees C for 0.01 seconds to 120 minutes, the material consisting of the following phases:
      (i) a hard magnetic phase $RE_2Fe_{14}B$ with an average grain size between 10 to 100 nanometers,
      (ii) one or more soft magnetic phases selected from the group consisting of α-Fe, α-(Fe,Co), $Fe_3B$, $(Fe,Co)_3B$, $Fe_2B$ and $(Fe,Co)_2B$ each having an average grain size between 2 to 60 nanometers,
      (iii) one or more metal M boride precipitated phases with an average size of 1 to 30 nanometers wherein M is one element selected from the group consisting of Ti, V, Nb, Hf, Cr, Zr and Mo.

2. The magnetic material of claim 1, wherein RE is Nd.

3. The magnetic material of claim 1, wherein M is at least one refractory metal selected from the group consisting of Ti, V, Nb, Hf, Cr and Mo.

4. The magnetic material of claim 1, wherein M is at least one refractory metal selected from the group consisting of Ti, Nb, and Cr; w=5 to 15 atomic percent, and z=2 to 2.5 atomic percent.

5. The magnetic material of claim 1, wherein the annealing occurred for 0.01 seconds to about 10 minutes.

6. The nanocomposite material of claim 2, wherein the annealing occurs for 0.01 seconds to about 10 minutes.

7. The magnetic material of claim 2, wherein x is about 10.5 to about 11 atomic percent.

8. The magnetic material of claim 1, wherein the hard magnetic phase comprises $Nd_2Fe_{14}B$.

9. The magnetic material of claim 8, wherein the soft magnetic phase comprises at least one material selected from the group consisting of α-Fe, $Fe_3B$ and a combination thereof.

10. The magnetic material of claim 9, wherein the material is substantially free of $Nd_2Fe_{23}B_3$.

11. The magnetic material of claim 10, wherein v=9.5 to 11, w=5 to 10, x=10.5 to about 11, and z=2 to 2.5.

12. The magnetic material of claim 1, wherein the material is in isotropic powder form with an average particle size between 10 to 200 microns, the powder having been rapidly solidified at cooling rates between $10^4$ to $10^6$ degrees C/second and heat treated at temperatures between 650 to 750 degrees C for 0.01 seconds to 120 miniutes.

13. The magnetic material of claim 1, wherein La comprises about 5 to about 7 atomic percent of the total rare earth elements, and the refractory metal is selected from a member of the group consisting of Ti, Nb, V, Mo, Hf and a combination thereof.

14. The magnetic material of claim 1, wherein Co comprises from 5 to 15 atomic percent.

15. The magnetic material of claim 1, wherein M is Ti.

16. The magnetic material of claim 15, wherein w is from about 1 to about 15 atomic percent.

17. The magnetic material of claim 15, wherein w is from about 5 to about 15 atomic percent.

18. The magnetic material of claim 15, wherein y is 0.05 to 0.07.

19. The magnetic material of claim 15, wherein the hard magnetic phase comprises $Nd_2Fe_{14}B$ and the soft magnetic phase comprises a member of the group consisting of α-Fe, $Fe_3B$ and a combination thereof.

20. The magnetic material of claim 15, wherein the material is substantially free of $Nd_2Fe_{23}B_3$.

21. The magnetic material of claim 15, wherein v is from 9.5 to 11 atomic percent, w is from 5 to 10 atomic percent, x is from 10.5 to about 11 atomic percent and z is from 2 to about 3 atomic percent.

22. The magnetic material of claim 15, wherein the material is in isotropic powder form with an average particle size between 10 to 200 microns, the powder having been rapidly solidified at cooling rates between $10^4$ to $10^6$ decrees C/second and heat treated at temperatures between 650 to 750 degrees C for 0.01 to 120 minutes.

23. The magnetic material of claim 22, wherein, the annealing occurs for 0.01 seconds to about 10 minutes.

24. A magnetic material having permanent magnetic properties of $BH_{max}$>8 MGOe, $B_r$>7.2 KG and $H_{ci}$>6 KOe,
having the chemical formula: $((RE)_{1-y}(La)_y)_v$ $Fe_{100-v-w-x-z} Co_w M_z B_x$,
wherein RE is at least one element selected from the group consisting of Pr and Nd;
M is at least one refractory metal selected from the group consisting of W, Ti, V, Nb, Hf, Cr, Zr and Mo;
v=about 9.5 to about 11.5 atomic percent
w=0 to about 15 atomic percent
x=about 9.5 to about 11 atomic percent
y=about 0.05 to about 0.15
z=about 2 to about 3 atomic percent,
comprising a composite of the following phases with sizes in nanometer ranges:
   (i) a $RE_2(Fe,Co)_{14}B$ hard magnetic phase with average grain size from about 10 to 100 nanometers,
   (ii) at least one soft magnetic phase selected from the group consisting of α-Fe, α-(Fe,Co), $Fe_3B$, $(Fe,Co)_3B$, $Fe_2B$ and $(Fe,Co)_2B$ the at least one soft magnetic phase having an average grain size of from 2 to 60 nanometers, and
   (iii) a refractory metal boride precipitated phase with an average particle size of 1 to 30 nanometers wherein the refractory metal is one or more of the elements from the group consisting of Ti, Nb, Hf, V, Mo, Cr and Zr.

25. The magnetic material of claim 24, wherein the hard magnetic phase comprises $Nd_2Fe_{14}B$ and the soft magnetic phase comprises Oα-Fe, $Fe_3B$ or a combination thereof.

26. The magnetic material of claim 24, wherein the material is substantially free of $RE_2Fe_{23}B_3$.

27. The magnetic material of claim 24, wherein the hard magnetic phase has an average grain size of from about 10 to about 100 nanometers, and the soft magnetic phase has an average grain size of from about 2 to about 60 nanometers.

28. The magnetic material of claim 27, wherein the refractory metal boride precipitated phase has an average size of from about 1 to about 30 nanometers.

29. The magnetic material of claim 24, wherein the material is in powder form.

30. The magnetic material of claim 29, wherein the powder has an average particle size of from about 10 to about 200 microns.

31. The magnetic material of claim 29, wherein the powder having been rapidly solidified and heat treated.

32. The magnetic material of claim 29, wherein the powder is substantially magnetically isotropic.

33. The magnetic material of claim 24, wherein the hard magnetic phase comprises $Nd_2Fe_{14}B$ and the soft magnetic phase comprises at least one material selected from the group consisting of alpha-Fe and $Fe_3B$.

34. The magnetic material of claim 24, wherein the material is substantially free of $Nd2_3Fe_{23}B_3$.

35. The magnetic material of claim 24, wherein the material is in isotropic powder form with an average particle size between 10 to 200 microns, the powder having been rapidly solidified at cooling rates between $10^4$ to $10^6$ degrees C/second and heat treated at temperatures between 650 to 750 degrees C for 0.01 seconds to 120 minutes.

36. A method of making a permanent magnet material of claim 1, characterized by magnetic properties of $BH_{max}$>8 MGOe, $B_r$>7.2 KG and $H_{ci}$>6 KOe, comprising
providing a molten composition
having the chemical formula: $((RE_{1-y}(La)_y)_v Fe_{100-v-w-x} ba-z Co_w M_z B_x$,
wherein RE is at least one element selected from the group consisting of Pr and Nd;
M is at least one refractory metal selected from the group consisting of W, Ti, V, Nb, Hf, Cr, Zr and Mo;
v=about 9.5 to about 11.5 atomic percent
w=0 to about 15 atomic percent
x=about 9.5 to about 11 atomic percent
y=about 0.05 to about 0. 15
z=about 2 to about 3 atomic percent,
rapidly solidifying the molten composition by cooling from melt as ribbons, filaments, particulates or powders at a cooling rate between $10^4$ to $10^6$ degrees C/second to form a substantially amorphous product; and
thermally treating the substantially amorphous product by annealing at temperatures between 650 to 750 degrees C for 0.01 seconds to 120 minutes to form the magnetic material,
the material consisting of the following phases:
   (i) a hard magnetic phase $RE_2Fe_{14}B$ with an average grain size between 10 to 100 nanometers,
   (ii) one or more soft magnetic phases selected from the group consisting of α-Fe, α-(Fe,Co), $Fe_3B$, $(Fe,Co)_3B$, $Fe_2B$ and $(Fe,Co)_2B$ each having an average grain size between 2 to 60 nanometers,
   (iii) one or more metal M boride precipitated phases with an average size of 1 to 30 nanometers wherein M is one element selected from the group consisting of Ti, V, Nb, Hf, Cr, Zr and Mo.

37. The method of claim 36, wherein the nanocomposite magnetic material comprises a $RE_2Fe_{14}B$ hard magnetic phase, a soft magnetic phase, and a refractory metal boride precipitated phase.

38. The method of claim 36, further comprising rapidly solidifying the molten composition at a rate of from about $10^5$ to about $10^{6}$° C. per second.

39. The method of claim 38, further comprising rapidly solidifying the molten composition by melt spinning.

40. The method of claim 32, further comprising grinding the substantially amorphous product before the thermal treatment thereof.

41. The method of claim 36, further comprising thermally treating the substantially amorphous product at a sufficient temperature for a sufficient time to cause nucleation of crystalline magnetic phases without substantial grain growth of the nucleated crystalline magnetic phases.

42. The permanent magnet material of claim 1, wherein y=about 0.05 to about 0.075.

43. The magnetic material of claim 24 wherein y=about 0.05 to about 0.075.

44. The method of claim 24, wherein y=about 0.05 to about 0.075.

45. The permanent magnet material of claim 1, wherein M is at least one refractory metal selected from the group consisting of Ti, V, Nb, Hf, Cr, Zr and Mo.

46. The magnetic material of claim 24, wherein M is at least one refractory metal selected from the group consisting of Ti, V, Nb, Hf, Cr, Zr and Mo.

47. The method of claim 36, wherein M is at least one refractory metal selected from the group consisting of Ti, V, Nb, Hf, Cr. Zr and Mo.

48. A bonded magnet comprising: a permanent magnetic material of claim 1; and a binder.

49. The bonded magnet of claim 48, wherein the binder comprises from about 0.5 to about 4 weight percent of the bonded magnet.

50. A method of making a bonded magnet comprising:

providing a powdered permanent magnetic material of claim 1;

mixing the powdered magnetic material with a binder; and curing the binder to form the bonded magnet.

\* \* \* \* \*